United States Patent
Kannwischer et al.

(10) Patent No.: US 11,980,958 B2
(45) Date of Patent: May 14, 2024

(54) POWER SKIVING TOOL

(71) Applicant: Hartmetall-Werkzeugfabrik Paul Horn GmbH, Tuebingen (DE)

(72) Inventors: Markus Kannwischer, Ergenzingen (DE); Eckhard Wagner, Moessingen (DE); Ervin Mujcin, Moessingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 1003 days.

(21) Appl. No.: 16/902,608

(22) Filed: Jun. 16, 2020

(65) Prior Publication Data
US 2020/0306851 A1 Oct. 1, 2020

Related U.S. Application Data

(63) Continuation of application No. PCT/EP2019/063573, filed on May 27, 2019.

(30) Foreign Application Priority Data

May 29, 2018 (DE) ...................... 10 2018 112 865.7

(51) Int. Cl.
*B23F 5/16* (2006.01)
*B23F 21/06* (2006.01)
(Continued)

(52) U.S. Cl.
CPC .............. *B23F 21/06* (2013.01); *B23F 21/10* (2013.01); *B23F 21/122* (2013.01)

(58) Field of Classification Search
CPC ........ B23F 21/06; B23F 21/10; B23F 21/122; B23F 21/12; B23F 5/163
See application file for complete search history.

(56) References Cited

U.S. PATENT DOCUMENTS 2,258,849 A * 10/1941 Erhardt ................... B23F 21/10
407/28
3,720,989 A 3/1973 Ramond
(Continued)

FOREIGN PATENT DOCUMENTS

CN 202984833 U 6/2013
CN 105121082 A 12/2015
(Continued)

OTHER PUBLICATIONS

International Search Report for International Application No. PCT/EP2019/063573, dated Aug. 19, 2019.
(Continued)

*Primary Examiner* — Sara Addisu
(74) *Attorney, Agent, or Firm* — Jason H. Vick; Sheridan Ross, PC

(57) ABSTRACT

A power skiving tool, having a shank extending along a longitudinal axis of the tool and a cutting head arranged at a front end of the shank. The cutting head comprises a plurality of circumferentially arranged teeth, wherein each of these teeth comprises a planar rake face at a front end of the cutting head that faces away from the shank, wherein the rake face is inclined at an angle other than 90° with respect to the longitudinal axis. A transition face is in each case arranged between the rake faces of two adjacent teeth. The transition face is arranged at the front end of the cutting head and adjoins the rake faces of the two adjacent teeth. Surface normals in all points of the transition face form an angle greater than 0° with the rake faces of the two adjacent teeth.

16 Claims, 4 Drawing Sheets

(51) Int. Cl.
*B23F 21/10* (2006.01)
*B23F 21/12* (2006.01)

(56) References Cited

U.S. PATENT DOCUMENTS

| | | |
|---|---|---|
| 8,950,301 B2 | 2/2015 | Marx et al. |
| 9,199,323 B2 | 12/2015 | Marx et al. |
| 2013/0243540 A1 | 9/2013 | Schaffeld |
| 2014/0079498 A1 | 3/2014 | Vogel |
| 2015/0375309 A1 | 12/2015 | Burtscher et al. |
| 2016/0158861 A1 | 6/2016 | Kleinbach et al. |
| 2018/0207736 A1 | 7/2018 | Stadtfeld et al. |
| 2019/0054554 A1 | 2/2019 | Sobczyk |
| 2022/0266364 A1* | 8/2022 | Hoss ..................... B23G 9/001 |

FOREIGN PATENT DOCUMENTS

| | | |
|---|---|---|
| CN | 105431246 A | 3/2016 |
| CN | 107378141 A | 11/2017 |
| DE | 243514 C | 2/1912 |
| DE | 102007015357 A1 | 10/2008 |
| DE | 102009003601 A1 | 9/2010 |
| DE | 202009009518 U1 | 9/2010 |
| DE | 102015121821 A1 | 6/2017 |
| DE | 102016008435 A1 | 1/2018 |
| EP | 0037909 A2 | 10/1981 |
| EP | 2639001 A1 | 9/2013 |
| FR | 1447376 A | 7/1966 |
| JP | S56-157921 A | 12/1981 |
| JP | 2015-202553 A | 11/2015 |
| JP | 2021024012 A * | 2/2021 |
| RU | 2012118251 A | 11/2013 |
| RU | 2584838 C2 | 5/2016 |
| WO | WO 2012/152659 | 11/2012 |
| WO | WO 2018/039118 | 3/2018 |

OTHER PUBLICATIONS

Written Opinion for International Application No. PCT/EP2019/063573, dated Aug. 19, 2019.
Examiner's Report for Canadian Application No. 3,085,404, dated Jul. 8, 2021.
Notification of Reasons for Rejection (Including Translation) for Japanese Patent Application No. 2020-539060 dated Aug. 31, 2021.
International Preliminary Report on Patentability for International Application No. PCT/EP2019/063573, dated Dec. 10, 2020.
First Office Action (Including Translation) for corresponding Chinese Patent Application No. 201980009096.9, dated Jul. 27, 2022.
Office Action (Including Translation) for corresponding Russian Application No. 2020117254/05(028797), dated Dec. 23, 2020.

* cited by examiner

POWER SKIVING TOOL

CROSS REFERENCE TO RELATED APPLICATIONS

This application is a continuation of international patent application PCT/EP2019/063573, filed on May 27, 2019 designating the U.S., which international patent application has been published in German language and claims priority from German patent application DE 10 2018 112 865.7, filed on May 29, 2018. The entire contents of these priority applications are incorporated herein by reference.

BACKGROUND

This disclosure relates to a power skiving tool. Power skiving tools are sometimes also referred to as hob peeling tools.

Power skiving is a method for manufacturing gearings, which is used, for example, in the manufacture of gear wheels. Power skiving as such has been known for more than 100 years. The first patent application on power skiving was filed in 1910 under the number DE 243514. In the following years, power skiving was not given much attention for a long time. In the past decade, however, this very old manufacturing method for machining a workpiece has been taken up again and is now widely used in the manufacture of various gearings. A comparatively recent patent application on this subject is, for example, WO 2012/152659 A1.

Power skiving is used as an alternative to hobbing or gear shaping. Compared to hobbing and gear shaping, it enables a significant reduction in machining time. Furthermore, a very high machining quality can be achieved. Power skiving therefore enables a very productive and at the same time high-precision manufacture of gearings.

In power skiving, the workpiece and the tool are driven in the same direction of rotation and at a coordinated (synchronized) speed ratio. The tool is set at a predetermined angle, usually referred to as cross-axis angle, relative to the workpiece. The cross-axis angle is the angle between the axis of rotation of the power skiving tool and the axis of rotation of the workpiece to be machined. To generate a feed motion, the tool and/or the workpiece is also moved in a translator manner. The resulting relative movement between the power skiving tool and the workpiece is thus a kind of helical movement, which has a rotational component (rotatory component) and a thrust component (translational component). The workpiece is machined with the teeth arranged circumferentially on the cutting head of the power skiving tool.

The cutting head or at least the teeth on it are preferably made of carbide, whereas the shank of the power skiving tool is typically made of steel. Depending on the size of the power skiving tool and/or the size of the gearing to be produced, the tool can also be made entirely of carbide. It is also possible to equip the cutting head of the power skiving tool with individual cutting inserts which form the teeth. Furthermore, carbide cutting edges forming the teeth may be brazed onto the replaceable head.

The rake faces are typically arranged on an upper side of the teeth; they form the front end of the cutting head that faces away from the shank of the power skiving tool. Typically, the rake faces are configured as planar surfaces. The rake faces are typically inclined with respect to the longitudinal axis of the power skiving tool, i.e. not perpendicular to the longitudinal axis. Therefore, they lie in different planes. The teeth themselves point away from the longitudinal axis of the tool in star-shaped manner, wherein the teeth do not necessarily have to extend exactly in radial direction.

The rake faces of the teeth are typically produced with a grinding wheel. This results in a step between the rake face of one tooth and the rake face of an adjacent tooth, which looks like a kind of stair step. FIG. 8 shows a section of a cutting head according to a typical example of the prior art. The illustration in FIG. 8 is obtained by viewing the cutting head in a plan view from a radial direction. Three adjacent rake faces are each marked with the reference numeral 20 in FIG. 8. A transition face, which results during grinding between two adjacent rake faces 20, is marked with the reference numeral 22 in FIG. 8. This transition face 22 comprises a planar flank 24, which is typically oriented orthogonally to the adjacent rake faces 20 on tools known from the prior art. This orthogonal alignment results automatically during the grinding process, since the grinding wheel machines the rake face 20 with its front side and the flank 24 with its peripheral side.

When manufacturing an internal gearing, the workpiece is conventionally first machined by internal turning. Thereby, the workpiece is machined by internal turning to an inner diameter which is determined by the tooth height of the teeth of the gearing produced later. Then the internal gearing with its tooth flanks and tooth roots is produced by the power skiving process. During this machining process, the surface of the tooth tips is produced by internal turning, whereas the surface of the tooth flanks and tooth roots is produced by power skiving. The tooth tips are those parts of the gearing which form the smallest inner diameter of the gearing in case of an internal gearing. The tooth roots, on the other hand, form the largest inner diameter of an internal gearing. In case of an external gearing, this is of course the other way round. In both cases, the tooth flanks run between the tooth tips and the tooth roots.

In contrast to the machining sequence mentioned last, it is often desired to produce the tooth tips of the gearing also by power skiving, so that internal turning is not necessary. However, the step shaped transition between adjacent rake faces which was mentioned above with reference to FIG. 8 poses a problem in such a case, as an interfering contour is formed on the tooth tips of the gearing by this transition, especially by the flanks 24 which are aligned orthogonally to the adjacent rake faces 20. This interfering contour is typically visible as a slight offset. Such an offset is undesirable as it may affect the quality of the gearing. Typically, the tooth tips of the gearing therefore have to be reworked in such a case, e.g. by grinding. This is time and cost intensive.

It goes without saying that the same problem also occurs in the manufacture of external gearings.

BACKGROUND

It an objective to provide a power skiving tool with an improved cutting head geometry by means of which the formation of an undesirable interfering contour on the tooth tips of the gearing can be avoided.

According to an aspect, a power skiving tool is presented which comprises a shank extending along a longitudinal axis of the tool and a cutting head arranged at a front end of the shank, wherein the cutting head comprises a planar rake face at a front end of the cutting head that faces away from the shank, wherein the rake face is inclined at an angle other than 90° with respect to the longitudinal axis, wherein a transition face is in each case arranged between the rake faces of two adjacent teeth, which transition face is also arranged at the front end of the cutting head and adjoins the rake faces of the two adjacent teeth, wherein surface normals in all points of the transition face form an angle greater than 0° with the rake faces of the two adjacent teeth.

In contrast to the prior art, the transition faces formed between the rake faces at the front end of the cutting head do not run orthogonally to the adjacent rake faces, but obliquely thereto. Tangents applied to the transition face are not orthogonal to the adjacent rake faces, but preferably run at an acute angle relative to them. This applies to any point on the transition faces, wherein the lateral boundaries (edges) of the transition faces are not counted as belonging to the transition faces.

According to a refinement, all surface normals in all points of the transition face form an angle greater than 10° with the rake faces of the two adjacent teeth. This corresponds to an angle between the rake face and a tangent at any point of the transition face that is less than 80°. This applies to every point on the transition faces, wherein the lateral boundaries (edges) of the transition faces are not counted as belonging to the transition faces. The tangent is considered to be the tangent that is oriented in the respective point in the direction of the maximum curvature of the transition face at this point, i.e. the tangent that has the maximum angle in the respective point under consideration with respect to the adjacent rake faces in comparison to the other tangents at this point.

The direction of the surface normals (and thus also the direction of the tangents) typically changes from point to point due to the curvature of the transition face. Nevertheless, the surface normals in all points of the transition face enclose an angle greater than 0° (not including 0°) with the rake faces of the two adjacent teeth.

With this type of alignment of the transition faces located between the rake faces, the formation of an interfering contour on the tooth tips of the gearing can be avoided without the need for prior internal turning or subsequent finishing, as this is the case with prior art power skiving tools.

Due to the inclined (non-orthogonal) alignment of the transition faces relative to the adjacent rake faces, there is no "hard" step shaped offset, as shown in FIG. 8 as an example of a prior art power skiving tool. This means that the inventive power skiving tool may also be used directly for machining the tooth tips of the gearing. The above-mentioned object is therefore completely solved.

According to a refinement, the transition face comprises at least one concave surface section. This concave surface section preferably adjoins one of the two adjacent rake faces.

The term "concave" is used herein to refer to a curvature that is curved inwards. Since the concave surface section is typically determined by the shape of the grinding wheel used to machine the teeth of the cutting head, concave surface sections with any radius of curvature are possible. Therefore, a curved surface section with a radius of a few or, for example, only one hundredth should still be regarded as a concave surface section and not as sharp-edged.

According to a further refinement, the transition face comprises a convex surface section. This convex surface section preferably adjoins one of the two adjacent rake faces.

The term "convex" is used herein to refer to a curvature that is curved outwards. For the same reasons as mentioned above in relation to the concave surface section, a convex curved surface section with a radius of curvature of only one hundredth is still to be understood as convex and not as sharp-edged.

According to another refinement, the transition face comprises a concave and a convex surface section, the concave surface section adjoins one of the two rake faces and the convex surface section adjoins the other one of the two adjacent rake faces.

According to a further refinement, the transition face comprises a planar surface section. This planar surface section preferably forms the central area of the transition face, which is located centrally between the two adjacent rake faces. However, the planar surface section may also adjoin at least one of the two adjacent rake faces.

Due to the definition mentioned at the outset regarding the orientation of the transition face, it still applies for the aforementioned concave, convex and/or planar surface sections of the transition face that surface normals in all points of these surface sections form an angle greater than 0°, preferably greater than 10°, with the rake faces of the two adjacent teeth.

According to a further refinement, the planar surface section directly adjoins the concave surface section.

According to a further refinement, the planar surface section is arranged between the concave surface section and the convex surface section. In this case the planar surface section forms the surface section of the transition face, which preferably has the same distance from both adjacent rake faces. The concave surface section preferably adjoins one of the two adjacent rake faces. The convex surface section preferably adjoins the other of the two adjacent rake faces.

According to an alternative refinement, the planar surface section directly adjoins one of the rake faces. In such a case, a sharp-edged corner is formed between the planar surface section and the one of the two adjacent rake faces.

According to a further refinement, the transition face comprises a concave and a convex surface section, wherein the concave surface section merges directly into the convex surface section.

Preferably, the transition face is, in accordance with all the above-mentioned refinements, configured as a continuous surface with a continuously changing gradient of the tangent.

The teeth of the cutting head preferably run radially outwards at an acute angle. They become narrower with increasing radial distance from the longitudinal axis.

On the circumferential side, each of the teeth comprises a flank that is preferably oriented skew to the longitudinal axis. The flanks of the teeth therefore preferably run non-parallel to the longitudinal axis.

According to a further refinement of the power skiving tool, the cutting head is releasably attached to the shank. In this case, the cutting head may be replaced as a whole when worn and replaced by a new one. Various interfaces may be realized as interface between the cutting head and the shank. Preferably the interface comprises a screw connection.

According to another refinement, the teeth of the cutting head are configured as cutting inserts, which are releasably attached to the cutting head. In this case the teeth can be replaced individually.

It goes without saying that the features mentioned above and those yet to be explained may be used not only in the combination indicated in each case, but also in other com-

DESCRIPTION OF PREFERRED EMBODIMENTS

Figure 1:
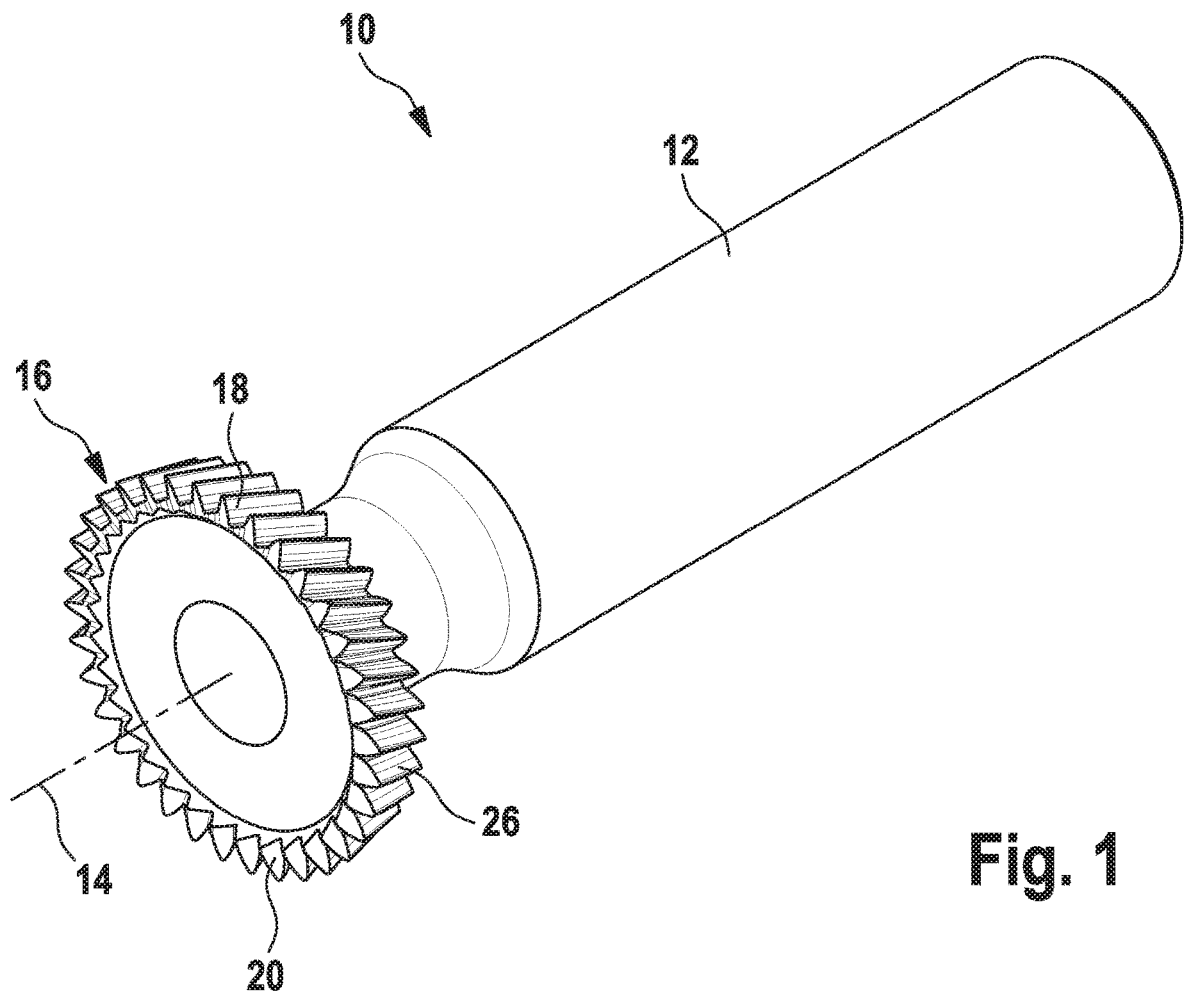
FIG. 1 shows a perspective view of an embodiment of the herein presented power skiving tool.
Figure 2:
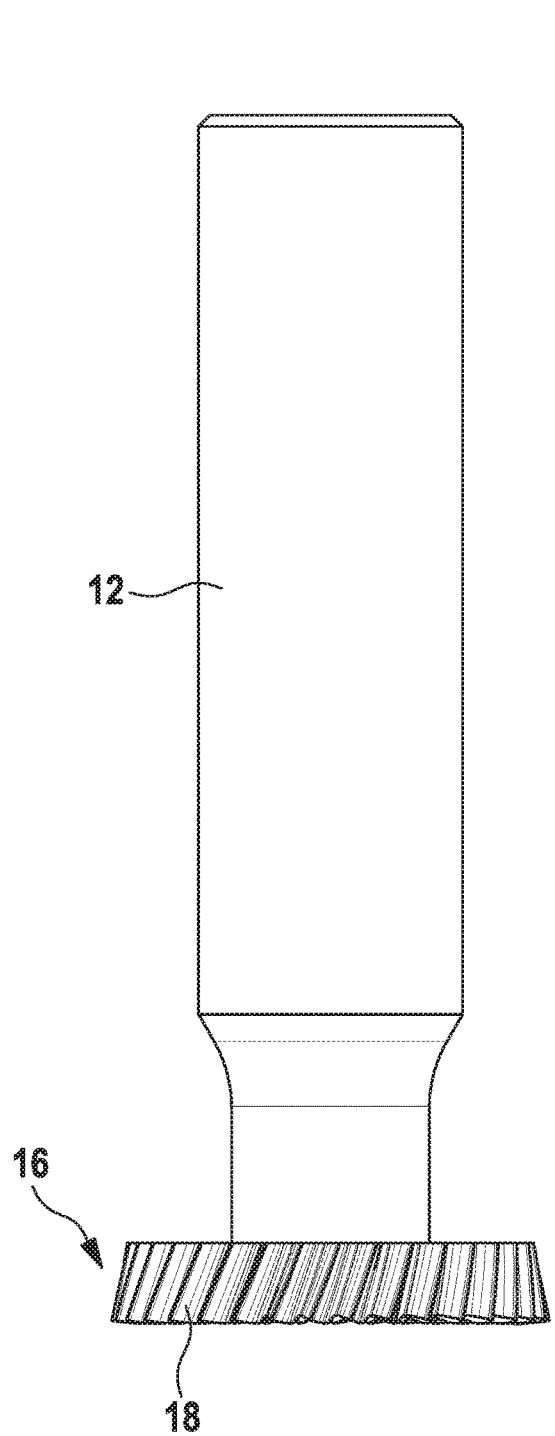
FIG. 2 shows a side view of the power skiving tool shown in FIG. 1.
Figure 3:
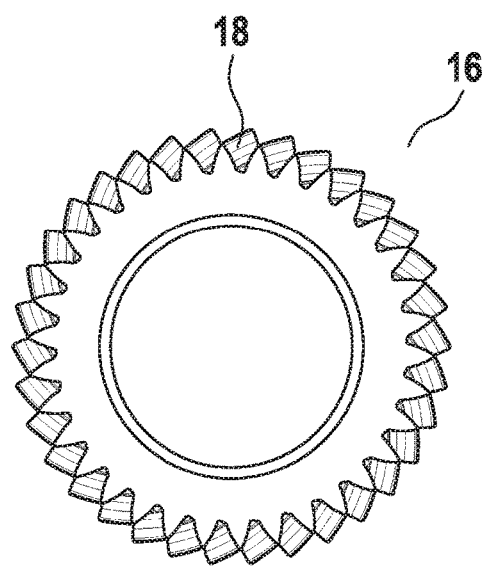
FIG. 3 shows a plan view from above of the power skiving tool shown in FIG. 2.
Figure 4:
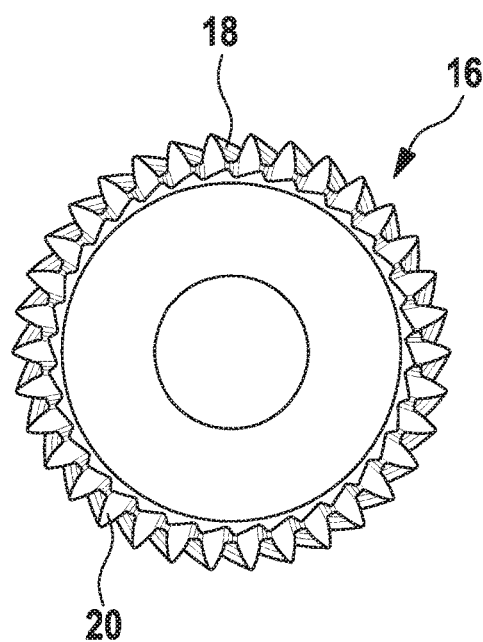
FIG. 4 shows a plan view from below of the power skiving tool shown in FIG. 2.

FIG. 1 shows a perspective view of an embodiment of the power skiving tool. The power skiving tool is denoted therein in its entirety with reference numeral 10.

The power skiving tool 10 comprises a shank 12 which extends along a longitudinal axis 14. In the shown embodiment, the shank 12 is cylindrical. In principle, however, it may also have a different shape, e.g. cuboid.

Furthermore, the power skiving tool 10 comprises a cutting head 16 which is arranged at a front end of the shank 12. A plurality of teeth 18 are arranged on the cutting head 16, which are distributed over the circumference of the cutting head 16.

Each of these teeth 18 comprises a rake face 20 at a front end of the teeth 18 that faces away from the shank 12. The teeth 18 taper radially outwards at an acute angle. Each of the teeth 18 comprises a circumferentially arranged flank 26 which represents the radially outermost part of each tooth 18 and thus also the radially outermost part of the cutting head 16. In the embodiment shown here, the flanks 26 are oriented skew to the longitudinal axis 14 of the power skiving tool 10 or the shank 12.

The rake faces 20 of each tooth 18 are in each case inclined at an angle other than 90° (not orthogonal) with respect to the longitudinal axis 14. Preferably, the rake faces 20 of all teeth 18 have the same inclination relative to the longitudinal axis 14. However, it is obvious that the rake faces 20 are not parallel to each other from a geometric point of view due to their star-shaped arrangement. However, the rake faces 20 of two adjacent teeth 18 run approximately parallel to one another.

Figure 5:
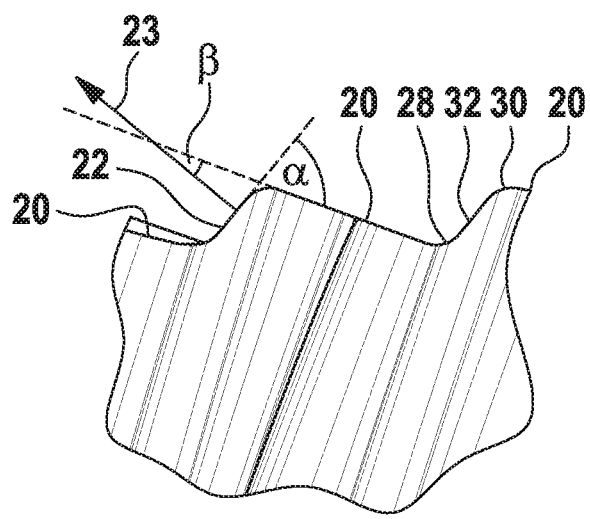
FIG. 5 shows a detailed view of a cutting head of the power skiving tool according to a first embodiment in a plan view from a radial direction.
Figure 6:
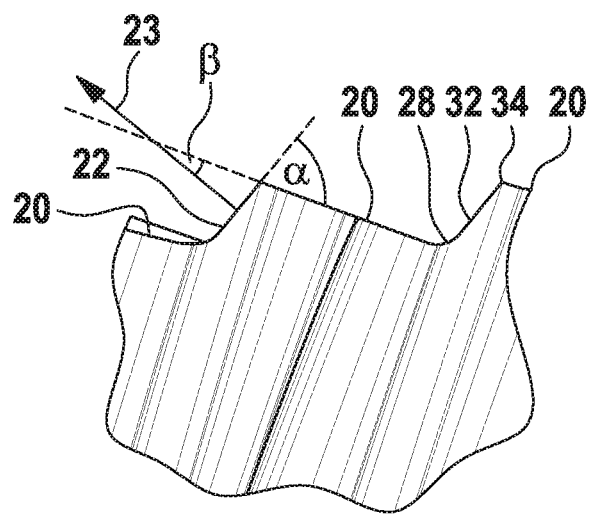
FIG. 6 shows a detailed view of the cutting head of the power skiving tool according to a second embodiment in a plan view from a radial direction.
Figure 7:
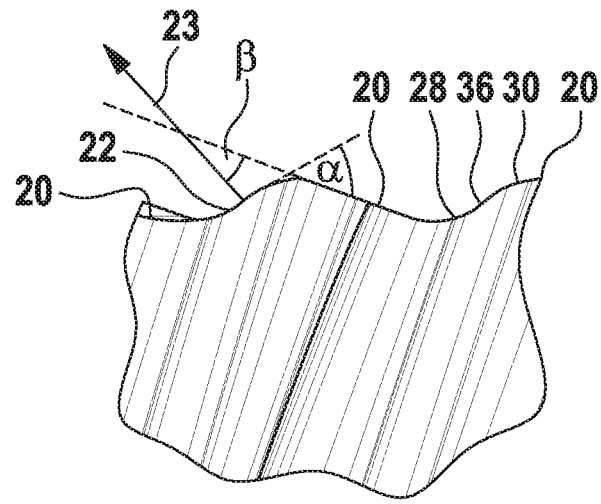
FIG. 7 shows a detailed view of the cutting head of the power skiving tool according to a third embodiment in a plan view from a radial direction.
Figure 8:
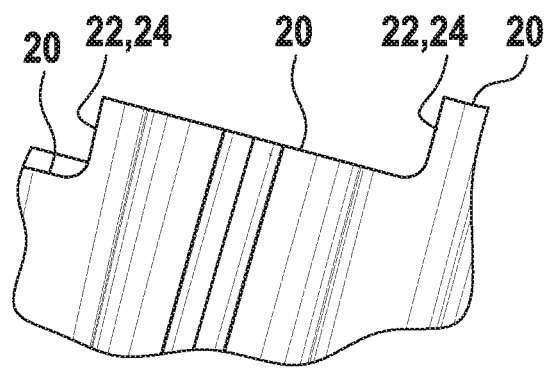
FIG. 8 shows a detailed view of a cutting head of a power skiving tool according to the prior art in a plan view from a radial direction.

Each of FIGS. 5-7 shows a detailed view of the front end of the cutting head 16 in a plan view from a radial direction. The front end of the teeth 18 has a slightly different shape according to the three different embodiments shown in FIG. 5-7. However, the three herein shown embodiments have in common that a transition face 22 is located between the rake faces 20 of two adjacent teeth 18. This transition face 22 is inclined relative to the adjacent rake faces 20.

The transition faces 22 are differently shaped depending on the embodiment, which will be discussed in more detail below. Common to all embodiments shown herein is that a tangent to the transition face 22, which tangent is indicated in the figures by a dotted line, is arranged at an angle $\alpha$, which is less than 90°, preferably less than 80°, with respect to the adjacent rake face 20 that lies in a planar plane. This angle $\alpha$ is preferably less than 90° at all points of the transition face 22, and particularly preferably less than 80°. Accordingly, the surface normals 23, which are each oriented orthogonally to the transition face 22, form an angle $\beta$ greater than 0°, particularly preferably an angle $\beta$ greater than 10° (10° including) with the adjacent rake faces. In FIGS. 5-7, the tangent and the surface normal 23 are each drawn at a point which has a maximum tangent gradient compared to the other points of the transition face 22. The angle $\beta$ is therefore, depending on the point on the transition face 22 in the range: $0°<\beta\leq 90°$, preferably in the range $10°\leq\beta\leq 90°$.

In the first embodiment shown in FIG. 5, the transition face 22 comprises a concave surface section 28, a convex surface section 30 and a planar surface section 32. The concave surface section 28 of the transition face 22 directly adjoins one end of one of the two adjacent rake faces 20. The convex surface section 30 of the transition face 22 directly adjoins one end of the other of the two adjacent rake faces 20. The planar surface section 32 is arranged between the concave surface section 28 and the convex surface section 30.

Preferably, the transition face 22 has a continuously changing curvature. The transition between the concave surface section 28 and the planar surface section 32 is therefore just as continuous as the transition between the planar surface section 32 and the convex surface section 30. The transitions are preferably not only continuous, but merge tangentially into each other. In the embodiment shown in FIG. 5, the rake faces 20 also preferably merge continuously and tangentially into the concave surface section 28 or the convex surface section 30.

The embodiment shown in FIG. 6 differs from the embodiment shown in FIG. 5 in that an edge (not rounded) is provided instead of the convex surface section 30 between the planar surface section 32 and the adjacent rake face 20. Here, the planar surface section 32 of the transition face 22 directly adjoins one of the two adjacent rake faces 20.

In the embodiment shown in FIG. 7, the transition face 22 does not comprise a planar surface section 32. Instead, the concave surface section 28, that adjoins one of the two adjacent rake faces 20, merges directly into the convex surface section 30, that adjoins the other one of the two adjacent rake faces 20. The transition between the concave surface section 28 and the convex surface section 30 is preferably a continuous and tangential transition. In FIG. 7, the dashed line, which indicates the aforementioned angle between the transition face 22 and the rake face 20, is arranged as a tangent at the turning point or the turning line 36 between the concave surface section 28 and the convex surface section 30. This point or line (in 3D) represents the point of maximum slope of the tangent at the transition face 22 in the embodiment shown in FIG. 7.

It goes without saying that instead of describing the angle $\alpha$ mentioned above by means of a tangent to the transition face 22, the corresponding opposite angle may also be described by means of the surface normal, which is oriented perpendicular to the transition face 22 at the respective point. Following the above-mentioned condition of $\alpha<90°$ or $\alpha<80°$, this means that the surface normal 23 encloses an angle greater than 0°, preferably greater than 10° (10° including) with the rake faces 20 of two adjacent teeth 18 at all points of the transition face 22 (except at the edges of the transition face 22). This inclination of the transition face 22 relative to the adjacent rake faces 20 effectively prevents the problem of an undesirable formation of an interfering contour at the tooth tips of the gearing to be produced.

It goes without saying that further embodiments are conceivable which result from combinations and permutations of the arrangements of the individual surface sections 28, 30, 32 of the transition face 22 shown in FIG. 5-7, without leaving the spirit and scope of the present disclosure.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A power skiving tool, having a shank extending along a longitudinal axis of the tool and a cutting head arranged at a front end of the shank, wherein the cutting head comprises a plurality of circumferentially arranged teeth, wherein each of these teeth comprises a planar rake face at a front end of the cutting head that faces away from the shank, wherein the rake face is inclined at an angle other than 90° with respect to the longitudinal axis, wherein a transition face is in each case arranged between the rake faces of two adjacent teeth, which transition face is arranged at the front end of the cutting head and adjoins the rake faces of the two adjacent teeth, wherein surface normals in all points of the transition face form an angle greater than 10° with the rake faces of the two adjacent teeth.

2. The power skiving tool according to claim 1, wherein the transition face comprises a concave surface section.

3. The power skiving tool according to claim 1, wherein the transition face comprises a planar surface section.

4. The power skiving tool according to claim 1, wherein the transition face comprises a concave surface section and a planar surface section, wherein the planar surface section adjoins the concave surface section.

5. The power skiving tool according to claim 1, wherein the transition face comprises a concave surface section, a planar surface section and a convex surface section, wherein the planar surface section is arranged between the concave surface section and the convex surface section.

6. The power skiving tool according to claim 5, wherein the concave surface section adjoins the rake face of one of the two adjacent teeth, and wherein the convex surface section adjoins the rake face of the other one of the two adjacent teeth.

7. The power skiving tool according to claim 3, wherein the planar surface section adjoins one of the rake faces of the two adjacent teeth.

8. The power skiving tool according to claim 1, wherein the transition face comprises a concave surface section and a planar surface section, wherein the planar surface section adjoins the concave surface section, and wherein the planar surface section adjoins one of the rake faces of the two adjacent teeth.

9. The power skiving tool according to claim 1, wherein the transition face comprises a concave surface section and a convex surface section, wherein the concave surface section adjoins the rake face of one of the two adjacent teeth and the convex surface section adjoins the rake face of the other one of the two adjacent teeth.

10. The power skiving tool according to claim 9, wherein the concave surface section adjoins the convex surface section.

11. The power skiving tool according to claim 1, wherein each of the teeth tapers radially outwards at an acute angle.

12. The power skiving tool according to claim 1, wherein each of the teeth comprises a circumferentially arranged flank that is oriented skew to the longitudinal axis.

13. The power skiving tool according to claim 1, wherein the cutting head is releasably attached to the shank.

14. The power skiving tool according to claim 1, wherein the shank is made of steel and the teeth of the cutting head are made of carbide.

15. A power skiving tool, shank extending along a longitudinal axis of the tool and a cutting head arranged at a front end of the shank, wherein the cutting head comprises a plurality of circumferentially arranged teeth, wherein each of these teeth comprises a planar rake face at a front end of the cutting head that faces away from the shank, wherein the rake face is inclined at an angle other than 90° with respect to the longitudinal axis, wherein a transition face is in each case arranged between the rake faces of two adjacent teeth, which transition face is arranged at the front end of the cutting head and adjoins the rake faces of the two adjacent teeth, wherein surface normals in all points of the transition face form an angle greater than 0° with the rake faces of the two adjacent teeth wherein the transition face comprises a convex surface section.

16. The power skiving tool according to claim 15, wherein the surface normals in all points of the transition face form an angle greater than 10° with the rake faces of the two adjacent teeth.

* * * * *